UNITED STATES PATENT OFFICE.

ALF SINDING-LARSEN, OF CHRISTIANIA, NORWAY.

PROCESS OF EXTRACTING METALS.

SPECIFICATION forming part of Letters Patent No. 607,287, dated July 12, 1898.

Application filed December 5, 1896. Serial No. 614,605. (No specimens.) Patented in Germany February 29, 1896, No. 91,002, and in Austria June 17, 1896, No. 46/2,411.

*To all whom it may concern:*

Be it known that I, ALF SINDING-LARSEN, a subject of the King of Norway and Sweden, and a resident of Christiania, Norway, have invented certain new and useful Improvements in Processes of Extracting Metals, (for which I have obtained a patent in Austria, dated June 17, 1896, No. 46/2,411, and in Germany, dated February 29, 1896, No. 91,002;) and I do hereby declare the following to be a full, clear, and exact description of the invention, such as will enable others skilled in the art to which it appertains to make and use the same.

My invention relates to the treatment of ores, and more particularly of sulfid ores, which are treated with a halogen gas without the use of heat, and to the subsequent recovery of the metals contained therein by a continuous process, in which the halogen salts of the metals are separated, the metals therein recovered, and the halogen separated and reutilized in an earlier stage of the process.

The object of the invention is to make possible the chlorination of ores without roasting and provide a process that can be utilized in localities where coal is expensive, but where water-power is convenient for generating electricity, leaching, and other purposes.

The raw material—sulfid ores, such as copper pyrites, for instance—is pulverized by any well-known process and, if necessary, washed to free the mass from any soluble gangue. The degree of pulverization of the ore is governed by the temperature to be developed during the chlorination. This disintegrated ore is exposed to the action of a current of chlorin gas in a gas-tight chamber from which all air is excluded and is well stirred and mixed, so as to enable the gas to penetrate the entire mass and prevent any caking on the surfaces. The chemical action of the chlorin on the pulverized ore generates sufficient heat to volatilize the volatile halogen compounds formed, and these are conducted into water or any other suitable absorbent, from which the chlorin is recovered by electrolysis to be used again in the process of chlorination. What these volatile compounds are depends upon the nature of the ore treated, and therefore cannot be precisely given; but if, for example, chalcopyrite or an ore composed of a mixture of iron and of copper pyrite be treated, when the requisite temperature is attained, sulfur, monochlorid of sulfur, $(S_2Cl_2,)$ and ferric chlorid $(Fe_2Cl_6)$ will be volatile products. It will be seen that the use of a fuel is thus dispensed with, the heat necessary being generated by chemical action instead. The resulting chlorids, which are comparatively free from volatile halogen compounds, are electrolyzed by the wet or dry process, electrodes being used which are not attacked by halogens, the metals recovered, and the resulting gas, usually a by-product, is returned to the first stage of the process to be again used for chlorination.

When the recovery of the metals from the chlorids is carried out by the wet process, the electrolyte is obtained by leaching the chlorinated ore with water, which dissolves all the soluble chlorids. The residuum is then washed with water and the sulfur and other valuable residues—such as the undissolved iron and copper, and the silver and gold, if any be present—recovered by such additional treatment as may be necessary, while the chlorids in the electrolyte are decomposed with the separation of a metal and chlorin, which is returned to the chlorinating-chamber, and any sulfur is washed and purified.

Should the ore under treatment be copper pyrites, the copper is first precipitated from the solution by metallic iron and the iron, chlorin, and sulfur then recovered from the solution by electrolysis.

If the chlorinated ore is to be treated by the dry process, the chlorination must take place in such a way that the various metalloids or non-metallic elements and the halogen compounds are obtained separately, and this is done by maintaining the raw material at such a temperature during chlorination that the greater part of the halogen compounds formed is volatilized and the fumes are passed through a series of vessels or condensers kept at the temperature of condensation of the various gaseous constituents, whereby these volatile compounds are recovered. The remaining chlorinated ore is then treated by the ordinary dry process.

The successive treatment of ores according to my invention forms a continuous process which may be expressed by the following symbols, in which M indicates a metal, A an element of the oxygen group, (oxygen, sulfur, selenium, tellurium,) and B a halogen:

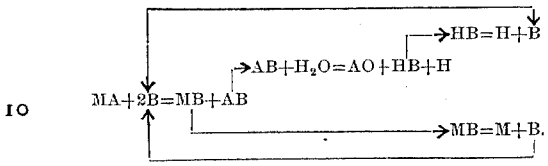

I do not wish to limit myself to the use of chlorin in the carrying out of my invention, as any other halogen may be used.

Having thus described my invention, what I claim as new therein, and desire to secure by Letters Patent, is—

1. A process for the treatment of sulfid ores, which consists in subjecting the pulverized ore to the action of a halogen gas, collecting and separating the compounds formed by the action of said halogen gas upon the metalloids by condensation, and recovering the metals from the ore thus treated, substantially as described.

2. A process for the treatment of sulfid ores, which consists in reducing the ore to a predetermined degree of fineness, subjecting said ore to the action of a halogen gas, collecting the volatile compounds formed by the action of said gas upon the metalloids, and extracting the metals from the mass, substantially as described.

3. A process for the treatment of sulfid ores which consists in subjecting pulverized ore to the action of a halogen gas, conducting off and collecting the volatile compounds formed by the action of the halogen gas upon the metalloids, leaching the ore thus treated and recovering the soluble constituents by electrolysis, and returning the resulting halogen gas to the cycle of operations, substantially as described.

4. A process for the treatment of cupriferous sulfid ores, which consists in subjecting the pulverized ore to the action of a halogen gas, collecting the volatile compounds formed by the action of the halogen gas upon the metalloids, electrically decomposing the same, returning the resulting halogen into the cycle of operations; leaching the ore treated with the halogen gas, precipitating the copper from such solution, then electrically recovering the halogen in such solution and returning the same into the cycle of operations, substantially as described.

5. A process for the treatment of cupriferous sulfid ores, which consists in subjecting pulverized ore to the action of a halogen gas, collecting and separating the volatile compounds formed by the action of said halogen gas upon the metalloids by condensation, electrolytically decomposing one or more of them and returning the resulting halogen gas into the cycle of operations; leaching the ore treated, precipitating and separating the copper from the solution, electrolyzing the remaining liquid, returning the resulting halogen into the cycle of operations, washing the residue and recovering the sulfur, substantially as set forth.

In witness whereof I have hereunto set my hand in presence of two witnesses.

ALF SINDING-LARSEN.

Witnesses:
ALFRED J. BRYN,
JOH VAABR.